Dec. 30, 1958 M. L. LAND 2,866,617
SHIELDED GAS TURBINE
Filed May 11, 1953
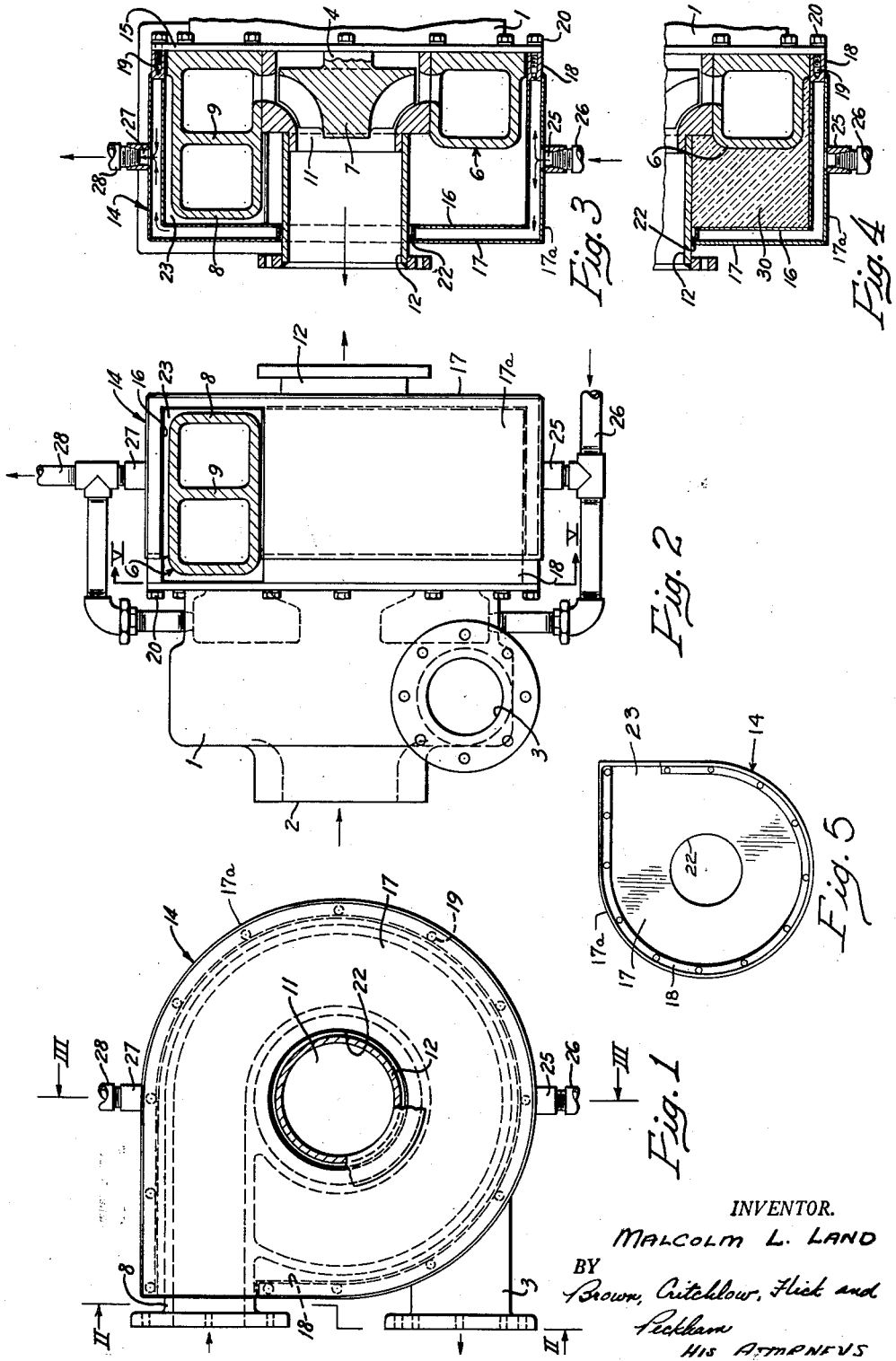
INVENTOR.
MALCOLM L. LAND
BY
Brown, Critchlow, Flick and
Peckham
HIS ATTORNEYS

United States Patent Office 2,866,617
Patented Dec. 30, 1958

2,866,617

SHIELDED GAS TURBINE

Malcolm L. Land, Jeannette, Pa., assignor to Elliott Company, Jeannette, Pa., a corporation of Pennsylvania Application May 11, 1953, Serial No. 354,010

4 Claims. (Cl. 253—39.1)

This invention relates to gas turbines, and more particularly to turbines that are shielded to protect operating personnel from burns.

The outer walls of many gas turbines become very hot because of the hot gases that operate them. As these turbines are often located where they are likely to be brushed against or touched by men working around them, severe burns may result. The use of insulation imposes large space requirements to bring the surface temperature down to a sufficiently low level, and the insulation becomes a fire hazard if soaked with oil. On the other hand, if a housing is placed around the turbine and cooling water is circulated between them serious problems arise. The water, in direct contact with the turbine walls, cools them and thereby takes energy out of the hot gases in the turbine. This reduces the efficiency of the turbine and at the same time places a high cooling load on the water. Contact of the water with the turbine also produces dangerous thermal stresses in the casing walls.

It is among the objects of this invention to provide a gas turbine which is shielded by a water cooled outer wall, which does not have its efficiency impaired by the shielding, which has outer casing walls free of dangerous thermal stresses, which does not impose a high cooling load on the cooling system, and in which the shielding is easy to make and apply and does not require undue space.

In accordance with this invention the turbine, which generally is a radial flow turbine driving an air compressor for supercharging, has a casing provided with an inlet and an outlet for hot gases. The outer walls of the casing are heated to a high temperature by the working gases flowing through it. To protect operating personnel from burns, the turbine walls are surrounded or covered by a shielding jacket that has spaced inner and outer walls. This jacket is provided with an inlet and an outlet to permit cooling water to be circulated between the jacket walls. The inner wall of the jacket is spaced from the outer walls of the casing to provide a thermal insulating space that keeps the casing walls from being cooled materially by the water jacket. In this way the outer wall of the jacket can be kept at a temperature safe to the touch without imposing a high cooling load on the jacket. Also, the gas in the turbine is maintained at the desired high temperature and the casing walls are not subjected to dangerous thermal stresses.

The preferred embodiment of the invention is illustrated in the accompanying drawings, in which Fig. 1 is a vertical end view of a supercharger showing the outer end of the turbine;

Fig. 2 is a vertical side view, partly in section on the line II—II of Fig. 1;

Fig. 3 is a central vertical section of the turbine taken on the line III—III of Fig. 1;

Fig. 4 is a fragmentary vertical section of a modification; and

Fig. 5 is a reduced view of the water jacket alone, taken on the line V—V of Fig. 2.

Referring to the drawings, a centrifugal air compressor 1 of any suitable form is provided with an air inlet 2 and a compressed air outlet 3. The impeller (not shown) of the compressor is mounted on a central shaft 4 which extends into a gas turbine casing 6 where it is driven by a bladed rotor 7 mounted on the end of the shaft. The turbine shown is of the radial flow type, in which the casing is of the well known scroll shape provided with a tangential inlet 8, which may, if desired, be divided into two parts by a vertical partition 9. The hot working gases leaving the rotor escape from the turbine through an axial outlet 11, from which a coupling pipe 12 may extend. The operation of such a combined turbine and compressor, known as a supercharger, is well known and need not be explained further.

It is a feature of this invention that the outer walls of the turbine casing, which are heated to a high temperature by the exhaust gases flowing through the turbine, are covered by a water cooled shield that can be maintained at touch temperature without cooling the casing walls enough to subject them to thermal stresses or to reduce the efficiency of the turbine. Accordingly, a double walled jacket 14 is placed around the turbine casing and over its outer end wall which has outlet 11 at its center. The jacket is circular for about 270° and then it extends out along inlet 8 as shown in Fig. 1. The shape of the jacket is also shown in Fig. 5. The jacket is held in position by fastening the inner end of it to a flange 15 extending radially from the supercharger between the compressor and the turbine. The flange may be secured to the turbine by any suitable means, such as welding. The flange is not round, but has a portion that extends out along the turbine inlet 8. It is the same shape as the flat outer end 17 of the jacket, as viewed in Fig. 1. It is preferred to space apart the walls of the jacket at their inner or compressor end by welding their edges to a heavy end bar 18 which extends around the turbine casing and out along the top of its inlet. The bar follows the edge of flange 15, but its ends terminates above and below inlet 8 as shown in Figs. 2 and 5. This bar may be provided at intervals with threaded openings 19 that receive screws 20 which extend through holes in the bolting flange and hold the bar against the flange. The bar not only serves as a spacing member for the jacket walls, but it also forms a heavy support for those walls, seals the space between their edges, and provides a convenient and sturdy way of attaching the jacket to flange 15.

The flat outer end wall 17 of the jacket is provided with a central opening 22, through which coupling pipe 12 extends. The outer side wall 17a of the jacket has an opening 23 for the turbine inlet 8. The ends of bar 18 are spaced apart by opening 23, as shown in Figs. 2 and 5, so that the jacket can be slipped over the turbine from its outer end before coupling pipe 12 is installed. The bottom of the jacket's side wall 17a is provided with an inlet 25 connected to a pipe 26, through which cooling water is delivered to the jacket. The top of the jacket has an outlet 27 connected to an outlet pipe 28 for carrying the water away after it has circulated through the water jacket.

An important feature of this invention is that the inner wall 16 of the jacket is spaced from the adjacent outer walls of the turbine casing, as shown in Fig. 3. The intervening space contains stagnant air, which serves to insulate the hot casing and the cool water jacket from each other. Consequently, the water does not have to do much cooling in order to maintain the outer wall of the jacket at a safe touch temperature. Since no coolant is circulated in the space between the the jacket and turbine casing, a minimum amount of heat is removed from the casing, thereby avoiding the disadvantages of imposing dangerous thermal stresses on the casing walls and removing energy from the working gases, which would reduce the efficiency of the turbine.

For more effective insulation of the turbine and shielding jacket from each other, the dead air space between them may be filled with any suitable insulating material 30, as shown in Fig. 4.

With the construction disclosed herein a cheap, low temperature metal can be used for the water jacket and it can be welded. No machined surfaces are necessary. The jacket can be made independently of the turbine and fastened to it later by means of the bolting flange and screws. Also, the jacket can have a simple shape, regardless of the irregularity of shape of the turbine casing, because the two do not have to fit together and do not touch.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A shielded gas turbine comprising an outer casing provided with an inlet and an outlet for hot gases, said casing having outer walls that are heated to a high temperature by said gases, and a shielding water jacket covering a portion of said walls and having spaced inner and outer walls, the jacket being provided with an inlet and an outlet to permit cooling water to be circulated between the jacket walls to keep the jacket outer wall cool enough to prevent burns, and the jacket inner wall being spaced from said casing outer walls to keep the casing from being cooled materially by the jacket.

2. A shielded gas turbine comprising an outer casing provided with an inlet and an outlet for hot gases, a flange projecting radially from one end of the casing, the opposite end and the sides of the casing being heated to a high temperature by the passage of said gases through the casing, a shielding water jacket covering said sides and opposite end and having spaced inner and outer walls, means connecting the jacket to said flange in spaced relation to said casing to insulate the casing from the jacket, and the jacket being provided with an inlet and an outlet to permit cooling water to be circulated between the jacket walls to keep the outer jacket wall cool enough to prevent burns.

3. A shielded gas turbine comprising an outer casing provided with an inlet and an outlet for hot gases, a flange projecting radially from one end of the casing, the opposite end and the sides of the casing being heated to a high temperature by the passage of said gases through the casing, a shielding water jacket covering said sides and opposite end, the jacket having spaced inner and outer walls connected by a sealing and spacing means extending around the casing beside said flange, screws extending through the flange and into said spacing means to connect the jacket to the flange, the jacket being provided with an inlet and an outlet to permit cooling water to be circulated between the jacket walls to keep the outer jacket wall cool enough to avoid burns, and the inner wall of the jacket being spaced from the casing to keep the casing from being cooled materially by the jacket.

4. In a shielded turbocharger having a radial flow gas turbine driving a compressor in axial alignment therewith, the turbine having an outer casing provided with a tangential inlet for hot gases and with an axial outlet at the end farthest from the compressor, a bolting flange projecting radially from the compressor end of the casing, a shielding water jacket encircling said casing and covering its outlet end around said outlet, the jacket having spaced inner and outer walls provided with openings therethrough registering with the casing inlet and outlet, the jacket also having a spacing member joined to the edge of its walls adjacent said flange and provided with threaded holes, said spacing member sealing the space between said wall edges, screws extending through the bolting flange and into said holes to fasten the jacket to the flange, the jacket being provided with an inlet and an outlet to permit cooling water to be circulated between the jacket walls to keep the outer jacket wall cool enough to avoid burns, and the inner wall of the jacket being spaced from the casing to keep the latter from being cooled materially by the jacket.

References Cited in the file of this patent

UNITED STATES PATENTS

| | | |
|---|---|---|
| 1,653,217 | Koch | Dec. 20, 1927 |
| 1,938,377 | Ducharme | Dec. 5, 1933 |
| 2,125,703 | Williams | Aug. 2, 1938 |
| 2,434,901 | Buck | Jan. 27, 1948 |
| 2,465,846 | Clegern | Mar. 29, 1949 |
| 2,470,126 | Altorfer | May 17, 1949 |
| 2,577,179 | Buchi | Dec. 4, 1951 |
| 2,646,210 | Kohlmann | July 21, 1953 |
| 2,686,653 | Frankel | Aug. 17, 1954 |